US009525304B2

(12) United States Patent
MacWilliams et al.

(10) Patent No.: US 9,525,304 B2
(45) Date of Patent: Dec. 20, 2016

(54) TECHNIQUES AND SYSTEMS FOR CHARGING ELECTRONIC DEVICES

(71) Applicants: Graham T. MacWilliams, Los Altos Hills, CA (US); Duncan S. MacWilliams, Los Altos Hills, CA (US)

(72) Inventors: Graham T. MacWilliams, Los Altos Hills, CA (US); Duncan S. MacWilliams, Los Altos Hills, CA (US)

( * ) Notice: Subject to any disclaimer, the term of this patent is extended or adjusted under 35 U.S.C. 154(b) by 0 days.

(21) Appl. No.: 14/221,196

(22) Filed: Mar. 20, 2014

(65) Prior Publication Data
US 2015/0270742 A1 Sep. 24, 2015

(51) Int. Cl.
*H02J 7/35* (2006.01)
*H02J 7/00* (2006.01)

(52) U.S. Cl.
CPC ............ *H02J 7/35* (2013.01); *H02J 7/0044* (2013.01); *H02J 7/0052* (2013.01); *Y02E 10/566* (2013.01)

(58) Field of Classification Search
CPC .......... H02J 7/35; H02J 7/0052; H02J 7/0044
USPC ....................................................... 320/101
See application file for complete search history.

(56) References Cited

U.S. PATENT DOCUMENTS

| | | | |
|---|---|---|---|
| 6,906,495 B2 | 6/2005 | Cheng et al. | |
| 7,271,569 B2 | 9/2007 | Oglesbee | |
| 8,427,098 B2 | 4/2013 | Moore et al. | |
| 2003/0140960 A1 | 7/2003 | Baum et al. | |
| 2008/0138680 A1 | 6/2008 | Hu et al. | |
| 2013/0109443 A1 | 5/2013 | Eaton et al. | |
| 2014/0368046 A1 | 12/2014 | MacWilliams et al. | |
| 2015/0270736 A1* | 9/2015 | MacWilliams | H02J 7/025 320/101 |

(Continued)

FOREIGN PATENT DOCUMENTS

FR 2879852 6/2006

OTHER PUBLICATIONS

U.S. Appl. No. 14/606,028, filed Jan. 27, 2015 and listing Graham T. MacWilliams and Duncan S. Williams as inventors.

(Continued)

*Primary Examiner* — Sun Lin
(74) *Attorney, Agent, or Firm* — Kenneth C. Brooks (57) ABSTRACT

The present invention is directed to a charging system for charging an electrical device coupled to a photovoltaic electrical power generator and one or more of a microelectromechanical power generator and a thermoelectric power generator. The system includes a source of optical energy and a base portion. The base portion has a surface, and the source is disposed to impinge optical energy toward the surface.

One or more of a heat source and an oscillator and is included in the base portion. The oscillator is connected to cause vibration of the surface, and the heat source is in thermal communication with the surface. The electrical device is disposed upon the surface to sense the optical energy and one or more of the vibration and the thermal energy. The charging station can be employed to rapidly charge an electrical device, such as a mobile electric device that facilitates multi-spectrum power generation. Alternatively, a multi-spectrum power generation attachment be included with charging station to facilitate backwards compatibility with existing electrical devices.

20 Claims, 7 Drawing Sheets

(56) References Cited

U.S. PATENT DOCUMENTS

2015/0270742 A1* 9/2015 MacWilliams ........... H02J 7/35
320/101

OTHER PUBLICATIONS

Wikipedia, Internet Publication, Photovoltaic System, May 27, 2013.
United States Patent Office, Office Action mailed Dec. 16, 2015 for U.S. Appl. No. 14/221,222.
United States Patent Office, Notice of Allowance mailed Jun. 27, 2016 for U.S. Appl. No. 14/221,222.
18th IEEE International Conference on Micro Electro Mechanical Systems, 2005. MEMS 2005, Generating Electric Power With a MEMS Electroquasistatic Induction Turbine-Generator, Steyn et al.
MicroGen Systems, Inc., Product Brochure for Vibrational Energy Harvesting Micro Power Generator, published 2012.

* cited by examiner

TECHNIQUES AND SYSTEMS FOR CHARGING ELECTRONIC DEVICES

The present invention relates to electricity production and more particularly to the charging of electronic devices not continuously coupled to an electrical grid.

Historically, electricity is generated at a central location, commonly referred to as a power station, and transmitted over a network of transmission lines to substations located proximate to demand centers. This is referred to as an electrical grid. The substations typically step-down the voltage and transmit the stepped-down electricity to end users of the demand centers. With the advent of computing technology mobile devices using electricity have increased the demand for devices that use electricity and are not continuously coupled to the electrical grid. Examples of such devices include cameras, sensors, telephones, radios, tablet computers, wearable electronic devices, lighting systems, automobiles and drones just to name a few.

Mobile electrical devices, such as cellular telephones, computing tablets and laptops have become the preferred device for the personal computing experience and have driven recent changes in power generating technology. This is, in part, attributable to the ease of transport that provides substantially continued access, as well as the expansion of wireless access to networked computing environments, such as the internet. Additionally, the computational power of these devices has attained a level almost equal to that of the traditional desktop computing environment. However, with the increased computational power of the mobile electrical devices the energy usage of the same also increases. This provides the deleterious effect of necessitating an increase in the size of the power storage device, e.g., battery. This reduces one or more of the attractive features of these devices, ease of transport. As size of the power storage device increases, so does the size and weight of the mobile electrical device. The typical solution to overcome the conflicting requirements of increasing the computation power of a mobile electrical device without increasing the weight and/or size of the same is to increase the efficiency of the computing device and/or the efficiency of the energy storage system. Another manner by which to address these conflicting requirements is to reduce the time required to charge a mobile device or increase the ease of charging the device.

One manner in which to reduce the time required to charge a mobile device employs magnetic resonance charging, also known as electromagnetic induction charging. To that end, the mobile electronic device is fitted with a shroud, or "sleeve", that facilitates coupling of electrical charge generated from a base station hardwired to the electrical grid. The shroud includes connectors compatible with the electrical charging receptacles of the mobile electronic device. The base inductively couples electrical energy from the grid to the shroud, which in turn, transmits electrical energy to the mobile electronic device. Specifically, the base emits an oscillating magnetic field that induces electric current in the "sleeve". Electrical current is transmitted to the mobile electronic device's battery using the conventional charge port included with the mobile electronic device mobile device.

U.S. Pat. No. 6,906,495 to Cheng et al. discloses a system and method for transferring power that does not require direct electrical conductive contacts. There is provided a primary unit having a power supply and a substantially laminar surface having at least one conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area; and at least one secondary device including at least one conductor that may be wound about a core; wherein the active area has a perimeter large enough to surround the conductor or core of the at least one secondary device in any orientation thereof substantially parallel to the surface of the primary unit in the active area, such that when the at least one secondary device is placed on or in proximity to the active area in a predetermined orientation, the electromagnetic field induces a current in the at least one conductor of the at least one secondary device.

U.S. Pat. No. 7,271,569 to Oglesbee discloses a contactless, inductive charger having a generally planar surface is provided. An image, text or other visual indicator is disposed upon the substantially planar surface such that the visual indicator represents a preferred placement orientation for an electronic device for optimal inductive charging. The Charger includes a primary coil positioned within the boundaries of the image, such that a user has a visual guide for placing the device on the charging surface for maximum efficiency in charging. The visual indicator, which may be a picture, outline, text or other directional indicator, may be geometrically similar to a shape of the electronic device or may be in the shape of a generic device. It may be disposed upon the charger by a method selected from the group consisting of painting, molding, silk screening, plating, vapor deposition and adhesive retention. Drawbacks with the prior art charging systems are manifold, including incompatibility of conflicting charging standards and perceived health issues with the presence of inductively coupled electromagnetic energy into a surrounding ambient.

A need exists, therefore, to provide improved techniques for charging of electronic devices.

BRIEF SUMMARY OF THE INVENTION

The present invention is directed to a charging system for charging an electrical device coupled to a photovoltaic electrical power generator and one or more of a microelectromechanical power generator and a thermoelectric power generator. The system includes a source of optical energy and a base portion. The base portion has a surface, and the source is disposed to impinge optical energy toward the surface. One or more of an oscillator or a heat source is included in the base portion. The oscillator is connected to cause vibration of the surface, and the heat source is in thermal communication with the surface. The electrical device is disposed upon the surface to sense the optical energy and one or more of the vibration and the thermal energy. The charging station may be employed to rapidly charge an electrical device, such as a mobile electric device that facilitates multi-spectrum power generation. Alternatively, a multi-spectrum power generation attachment may be included with the charging station to facilitate backwards compatibility with existing electrical devices. Other embodiments of the current invention are described more fully below.

DETAILED DESCRIPTION OF THE INVENTION

Figure 1:
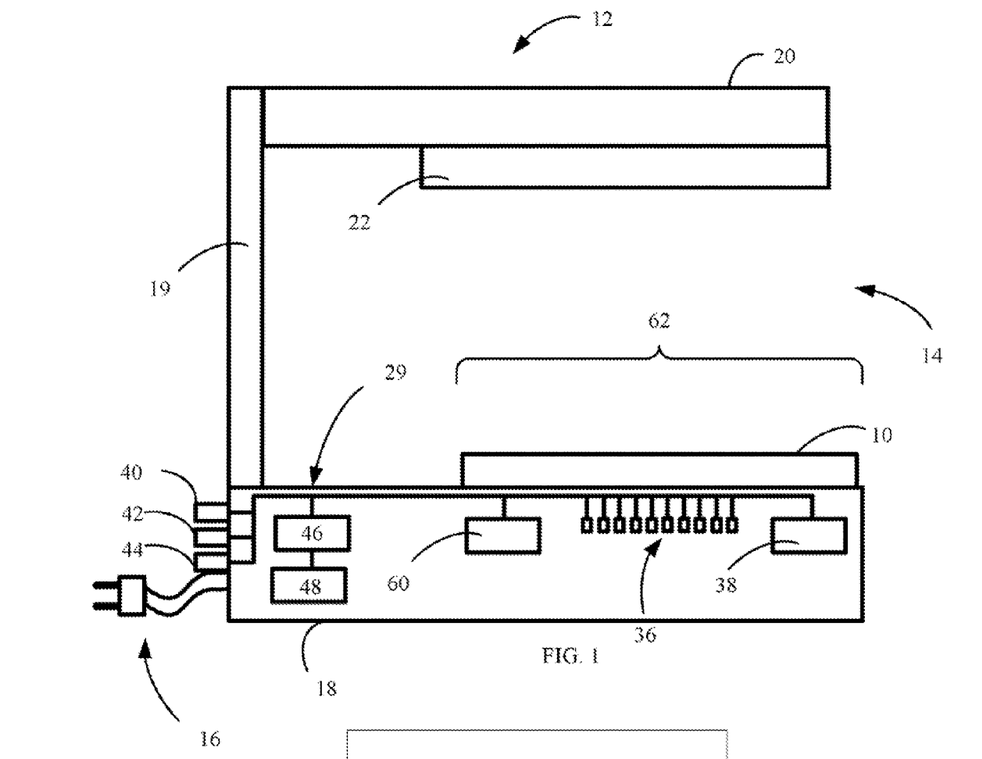
FIG. 1 is a simplified side view of a charging station in accordance with a first embodiment of the present invention.

Referring to FIG. 1 one example of the present invention for use in charging an electrical device 10 includes a charging station 12. Charging station 12 is typically powered by coupling the same to an electrical grid, for example by way of connector 16. Charging station 12 includes a base platform 18 and a boom 20 disposed opposite to and spaced-apart from base platform 18. A stanchion 19 extends from base platform 18 to boom 20 fixedly securing boom 20 to base platform 18. Boom 20 includes a source 22 of optical energy arranged to direct optical energy toward base platform 18 through a portion of volume 14 located between source 22 and based platform 18. In this manner optical energy produced by source 22 travels toward surface 29 of base platform 18 impinging thereupon or objects resting on base platform 18, such as electrical device 10. Typically electrical device 10 generates electrical current in response to optical energy, e.g., a device that may produce electrical current in response to either ambient light and/or artificial light.

Figure 2:
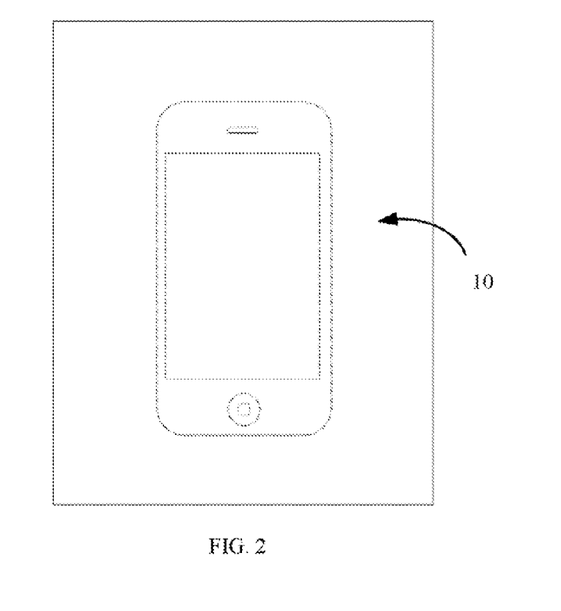
FIG. 2 is a simplified top view of an example of an electrical device that may employ the present invention.

Referring to FIG. 2, an example of electrical device 10 that may employ the current invention is shown, which is commonly referred to as a smart phone. One such smart phone is sold by Apple Computer of Cupertino, Calif. under the trade name iPhone®, or the mobile electrical device available from the Open Handset Alliance of South Korea under the name Android®.

Figure 3:
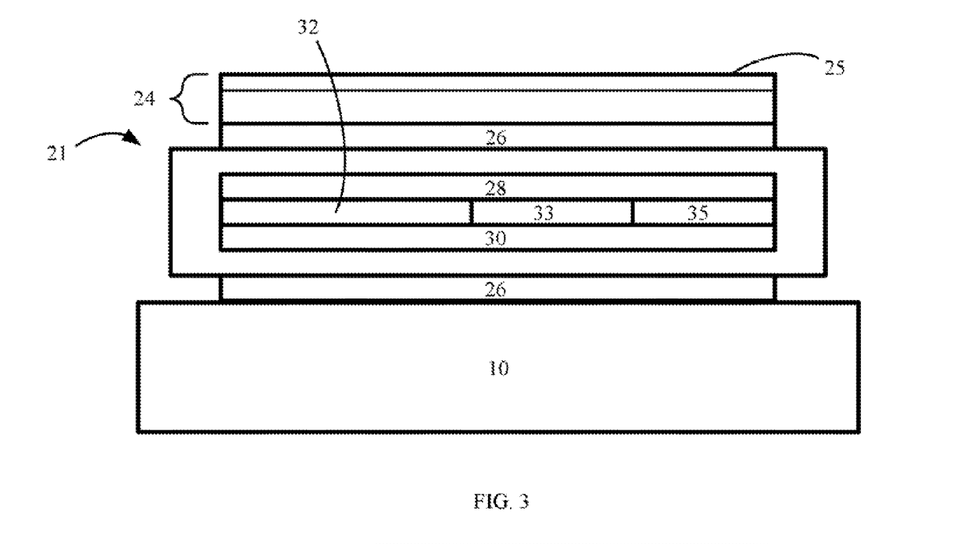
FIG. 3 is a side view of power generation system that may be used to power the electrical device shown in FIG. 2 in accordance with the present invention.

Referring to both FIGS. 1 and 3, in electrical communication with electrical device 10 is a jump case 21. Jump case 21 includes a multi-spectrum power generation system to power electrical device 10. The jump case 20 includes a photovoltaic electrical power generator 24 having a photosensor 25 to sense desired frequencies of light, a thermoelectric power generator 26 and a microelectromechanical power generator 28. Jump case 21 also includes a primary power storage system 30 in electrical communication with electrical device 10 and a controller system 32. Controller system 32 is in data communication with jump case 21 to regulate electrical communication between primary power storage system 30 and the jump case 21. To that end, controller system 32 includes a computer processor 33 and a memory 35 that stores computer readable instructions that are operated on by processor 33 to regulate Jump case 21 and a plurality of switches (not shown), discussed more fully in United States patent application Ser. No. 13/920,013 filed Jun. 17, 2013 and entitled TECHNIQUES AND SYSTEMS FOR GENERATING POWER USING MULTI-SPECTRUM ENERGY and having Graham T. MacWilliams and Duncan S. MacWilliams listed as inventors and is incorporated by reference herein.

Referring again to both FIGS. 1 and 2, jump case 21 also includes a thermal dissipation system coupled between thermoelectric power generator 26 and controller system 32 to remove thermal energy away from jump case 21 and to provide the required thermal gradient for the thermoelectric power generator 26. Primary power storage system 30 may be any suitable electrical storage device. Examples of primary power storage system 30 include lithium batteries, nickel cadmium batteries, nickel metal hydride, nickel polymer batteries, lithium sulfur battery, potassium-ion battery and the like. It is also contemplated that certain thin film batteries from this emerging field may also be employed as primary power storage system 30. It should be understood that primary power storage system 30 may comprise of a battery native to electrical device 10, i.e., one that is included with the same. Alternatively, power source may be completely integrated to include primary power storage system 30. In this manner jump case 21 may be an aftermarket device to be used with an existing electrical device 10. Alternatively, jump case 21 may be used as a replacement for a native battery in a mobile computing device 10. It is desired, however, that primary power storage system 30 be capable of being recharged after power has been drained therefrom. To that end, jump case 21 is a multi-spectrum power generation system with which to produce electricity to recharge primary power storage system 30.

Referring to FIGS. 1 and 3, taking advantage of jump case 21, charging station 12 employs multi-modal charging operations. To that end, charging station base platform 18 includes heating elements 36 in addition to source 22. Specifically, source 22 is employed to generate electrical current in the photovoltaic electrical power generator 24. To that end, source may be any suitable source of optical energy, such as light emitting diodes, tungsten halogen, xenon or mercury-based lamps. For the most common silicon-based solar cells, it is desired that the spectrum of optical energy produced by source be in a range of 400 nm to 1000 nm. Other solar cells may be employed, such as Gallium Arsenide based or Germanium based, that have a different spectrum of operation. Heating elements 36 operate to cause electrical current to be generated by thermoelectric power generator 26. Heating elements 36 may be any known in the art; however, in the current embodiment heating elements 36 are associated with a resistive heating apparatus and can heat to any desired temperature. It is desired that heating elements 36 heat in a range of 10 to 30 degrees Celsius above ambient temperature. Charging station 12 may also include an oscillator 38 to deliver mechanical motion to micro-electromechanical power generator 28. Any known oscillator 38 may be employed to that end that produces vibratory forces in a range of 60 hz to 20,000 hz range and an amplitude of about 0.1 G acceleration.

Figure 4:
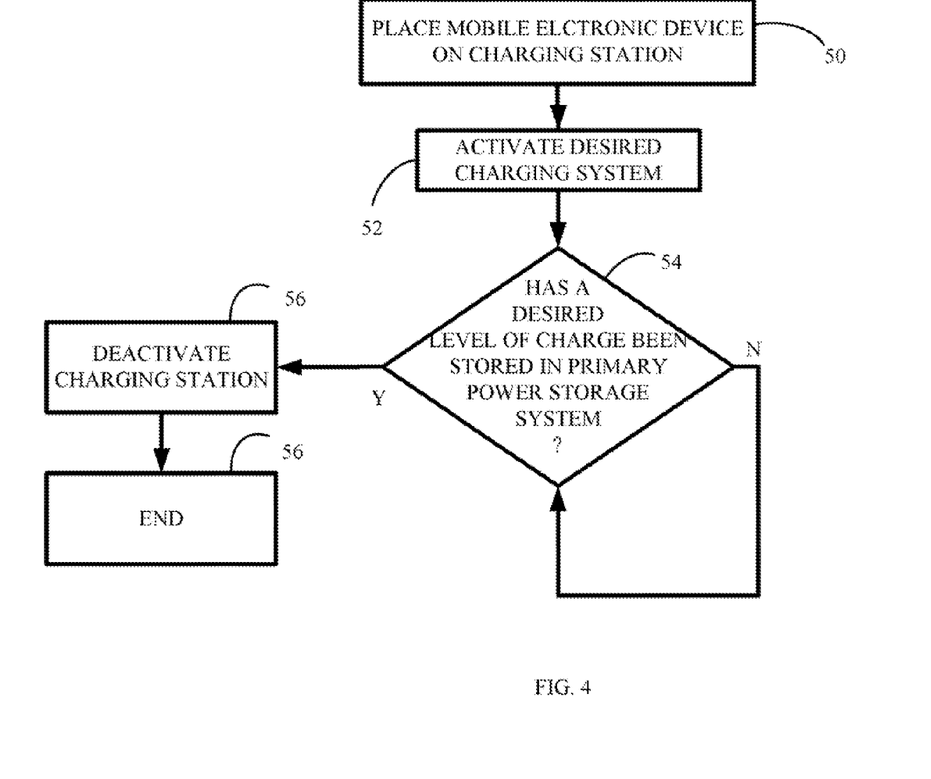
FIG. 4 is a flow diagram demonstrating the operation of the charging station shown in FIG. 1.

Referring to FIGS. 1, 3 and 4, in operation, electrical device 10 is placed on charging station 12 at step 50. It is desirous that electrical device 10 be arranged so that photovoltaic electrical power generator 24 faces source 22. In this manner the flux of optical energy impinging upon electrical device 10 may be maximized. At step 52, charging station 12 is activated using one of a myriad of techniques. In one embodiment, switching element 40 is provided operates to activate source 22, heating elements 36 and oscillator 38, concurrently. However, in another embodiment, multiple switching elements may be employed, shown as 40, 42 and 44, so that each of source 22, heating elements 36 and oscillator 38 may be activated independent of the other. In the simplest arrangement each of source 22, heating elements 36 and oscillator 38 has a separate switch that associated therewith so that it may be activated. However, it should be borne in mind that any switching element may be employed to that end, such as a rotary switch that enables any combination of source 22, heating elements 36 and oscillator 38 to be activated concurrently or not at all, e.g., either source 22 and heating elements 36 may be concurrently activated with oscillator 38 being inactive; source 22 and oscillator 38 may be activated with heating elements 36 being inactive; or heating elements 36 and oscillator 38 may be concurrently activated with source 22 being inactive.

Additionally, operating of charging system 12 may be under control of processor 46 operating on computer readable instructions stored in memory 48, which is in electrical communication therewith. To that end, processor 46 is in electrical communication with one or more of switching elements 40, 42 and 44 and/or source 22, heating elements 36 and oscillator 38 to control the operations thereof, i.e., activation and deactivation as well as a range of luminescence produced by source 22, a range of temperatures produced by heating elements 36 and a range of frequencies and amplitude of vibratory signals produced by oscillator 38. One example of charging station 12 includes a single switch 40, i.e., switches 42 and 44 being omitted, and processor 46 is in electrical communication with heating elements 36 and oscillator 38 to control the operation thereof, including activation and deactivation of source 22, heating elements 36 and oscillator 38. In an alternative embodiment processor 46 may be in electrical communication with only switching elements 40, 42 and 44 thereby enabling activation and deactivation of source 22, heating elements 36 and oscillator 38 and control of the operation thereof through switching elements 40, 42 and 44. In yet another embodiment only a single switching element, element 40, is included and processor 46 controls operation of one or more of source 22, heating elements 36 and oscillator 38 through switching element 40, as well as activation and deactivation of the same.

At step 54 a determination has made to determine whether the desired level of charge been stored in a battery, i.e., has a desired level of charge been stored in primary power storage system 30. If the level reached is that which is desired, then the operation of charging station 12 ceases at step 56. If not, step 54 repeats. The manner in which to determine whether a desired charge level has been reached may be based upon the passage of a predetermined time. To that end, a user-configurable timer, shown as element 60 may be included that operates to deactivate source after a period of time. Alternatively, element 60 may be a photosensor that senses optical energy from source 22 and causes source 22 to deactivate after sensing a desired quantity of flux. Specifically, element 60 may be in signal communication with processor 46 to cause the same to deactivate source 22. In another embodiment, element 60 may be an inductively coupled charge sensing device that measures the change in charge present in primary power storage system 30. Once element 60 determines that the change in charge has substantially ceased it operates to cause processor 46 to deactivate operation of charging station 12. Of course element 60 may be omitted entirely, as can processor 46 and memory 48. Alternatively, processor 46 may be omitted, as well as memory 48 and element 50 may be connected to one or more of switching elements 40, 42 and 44 to cause switching elements 40, 42 and 44 to deactivate source, 22, heating elements 36 and oscillator 38, respectively. Were only a single switching element, such as element 40, employed to control operation of each of source 22, heating elements 35 and oscillator 38, element 60 would be in signal communication with element 40 to cause deactivation of one or more of source 22, heating elements 36 and oscillator 38.

It is conceivable that operation of charging station 12 may occur in a myriad of situations, such as charging of a mobile computing device. For example, the charging may occur in locations where optical energy generated by source 22 diffusing into the environment surrounding charging system 14 is undesired. One manner in which to satisfy this requirement is to control the flux of optical energy produced by source 22 so as to illuminate a region 62 of surface 29 that is in superimposition with electrical device 10. This could be achieved, in part, by minimizing the optical energy impinging upon surface 29 outside of region 62. However, it is desirous to maximize the flux of optical energy impinging upon electrical device 10, i.e., to minimize the portions of electrical device 10 that sense optical energy in furtherance of producing electrical current in response thereto that are outside of the flux of the optical energy. To that end, alignment marks (not shown) may be present on surface to indicate the proper orientation of electrical device 10 with respect to source 22. The marks (not shown) may be indicia (not shown) present on surface 29 may be detents (not shown) or protrusions (not shown) extending therefrom and between the sides of electrical device 10.

Figure 5:
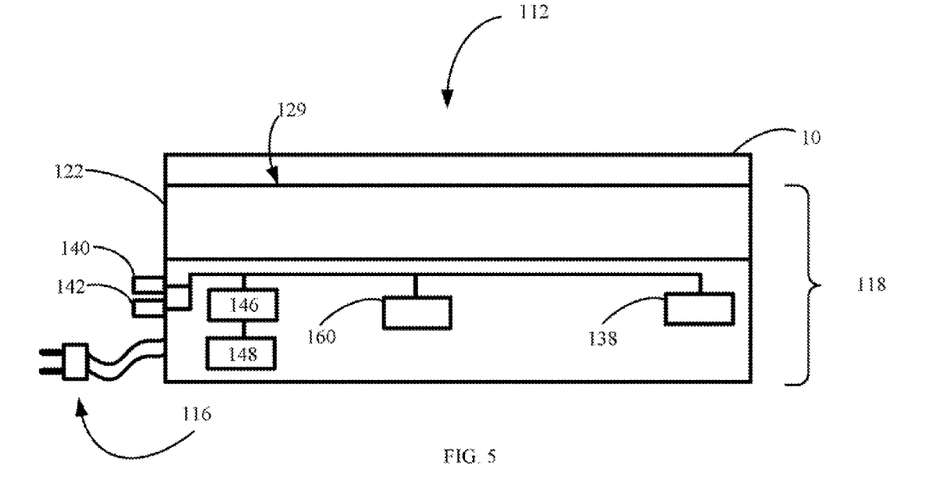
FIG. 5 is a simplified side view of a charging station in accordance with a second embodiment of the present invention.

Referring to FIGS. 1, 3 and 5 another embodiment of charging station 112 places source 122 on the same side of electrical device 10 as oscillator 138. With this arrangement the foot print of charging station 12 is reduced and the design simplified. For example, with the judicious selection of source 122 electrical device 10 may be heated by source 122, as well as receive optical energy produced thereby. Examples of source 122, as well as source 22, include halogen lights, high power light emitting diodes and the like. In this manner, source 122 causes both photovoltaic electrical power generator 24 and thermoelectric power generator 26 to produce electrical current to charge primary power storage system 30. To facilitate these operations it is desired to arrange oscillator 138 so that source 122 is disposed between oscillator 138 and surface 129 upon which electrical device 10 rests. Source 122 provides sufficient heat to enable thermoelectric system 26 to generate electrical current. Thus, the foot print of charging system 112 is less than the foot print of charging system 12 by using source 122 to both heat and impinge optical energy on surface 129. It should be understood, however, that in order to further reduce the footprint of charging system 112, 138 may be obviated. The remaining features 116, 140, 142, 160 of charging system 112 are the same as features 16, 40, 42, and 60, respectively, of charging system 12. Features 146 and 148 are the same as feature 46 and 48 with the exception that the computer readable instructions in memory 146 do not include routines for controlling heating elements, which are not present in charging station 112.

Another benefit of charging system 112 is that it enables more precise control over optical energy diffusing into the environment surround charging system 12. In one embodiment, surface 129 is coextensive with the shape of electrical device 10. In this manner, the entire area of surface of source 122 is in superimposition with electrical device. The ease of alignment between base portion 118 and electrical device 10 may be easily achieved by using a user's fingers (not shown). Alternatively, guides may be present on the periphery of base portion 118 between which are fitted the sides of electrical device.

Figure 6:
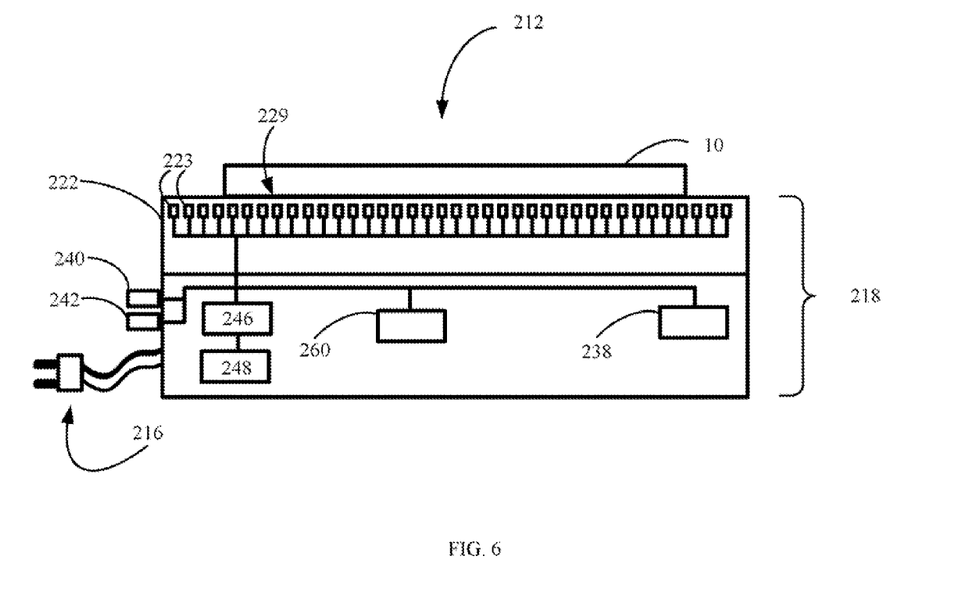
FIG. 6 is a simplified side view of a charging station in accordance with a third embodiment of the present invention.
Figures 7, 11:
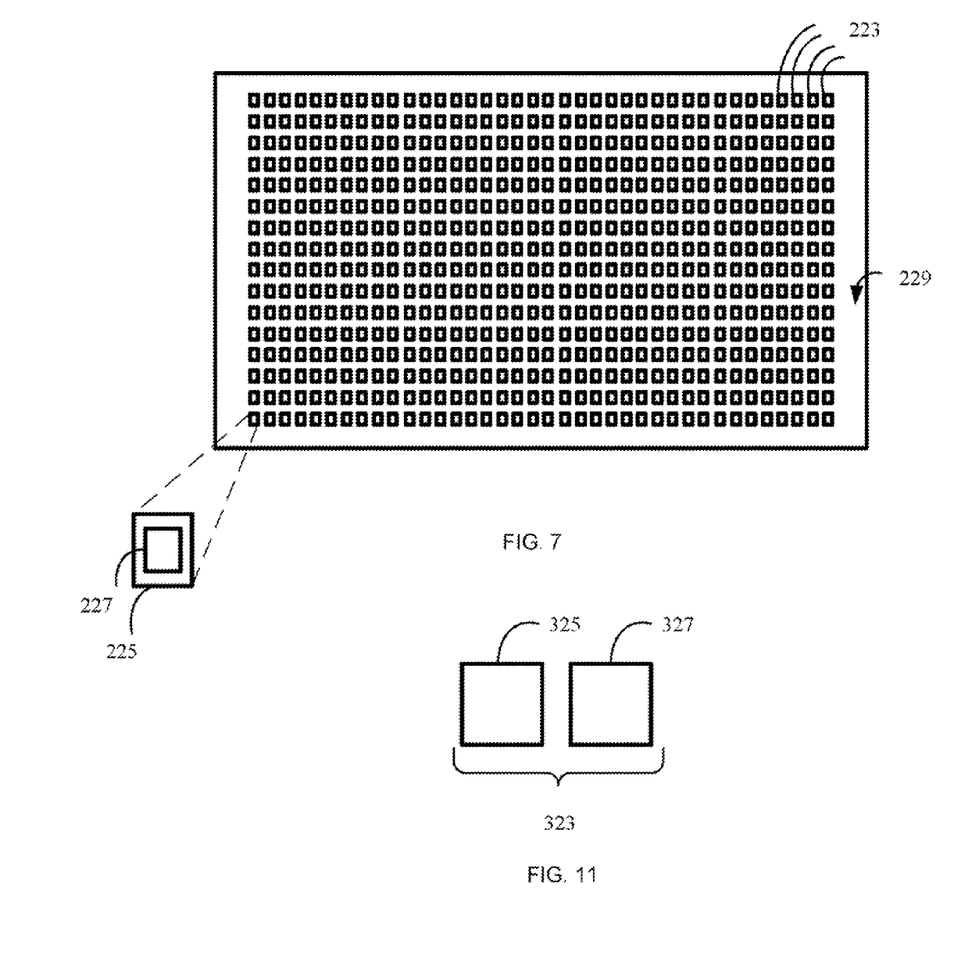
FIG. 7 is a top down view of the charging station shown in FIG. 6.
FIG. 11 is a detailed view of an emitter-sensor pair shown in FIG. 7 in accordance with an alternate embodiment of the present invention.

Referring to FIGS. 5, 6 and 7 another embodiment of charging station 212 relaxes the alignment requirements of source 222 with electrical device 10 while minimizing the diffusion of light into environment surrounding charging system 214. To that end, base portion 218 includes a source 222 consists of a plurality of spaced-apart emitter-sensor pairs 223. Each of which is in electrical communication with processor 246. Each emitter-sensor pair 223 includes an emitter of optical energy 225 and an optical sensor 227. Thus provided are a plurality of spaced-apart light emitters 225, and a plurality of spaced-apart optical sensors 227. Each of spaced-apart emitters 225 is proximate to one of the plurality of spaced-apart optical sensors 227. As shown, each emitter 225 is concentric with one of the plurality of spaced-apart optical sensors 227. The plurality of spaced-apart emitter-sensor pairs 223 is arranged to emit light from a common plane in grid or matrix. However, it should be understood that any arrangement may be provided. It is desired, however, that the arrangement of the plurality of emitter-sensor pairs 227 be periodic. Optical sensors 227 control light emitters 225 so that only light emitters 225 in superimposition with electrical device 10 function. The remaining light emitters 225 do not emit optical energy. Optical sensors 227 of the emitter-sensor pairs 223 operate to produce signals that allow processor 246 to sense the shape of electrical device 10 and produce an illuminated region corresponding to the shape. The operation of optical sensors 227 of the plurality of emitter-sensor pairs 225 depends upon the level of ambient light of the environment in which charging station 212 is present.

Figure 8:
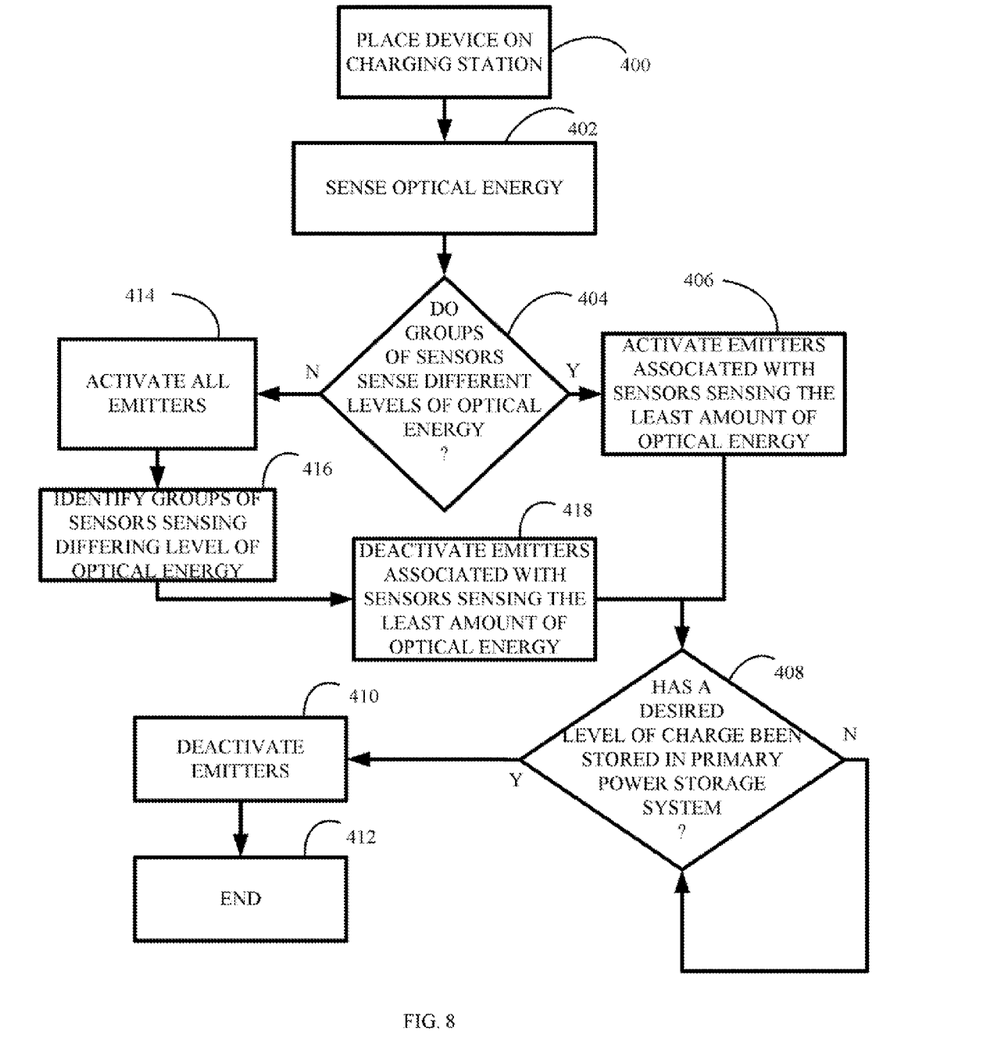
FIG. 8 is a flow diagram demonstrating the operation of the charging station shown in FIGS. 6 and 7.

Referring to FIGS. 6-8, assume that charging station 212 is in an environment in which the level of ambient light was sufficient to create an optical flux differentiation between different sets of optical sensors 227. Specifically, at step 400, electrical device 10 is placed upon surface 229. As a result, optical sensors 227 of a first set of emitter-sensor pairs 223 are covered. At step 402 sensors 227 sense optical energy. In this arrangement a substantial reduction of optical flux is sensed by sensors 227 in superimposition with electrical device 10. Specifically, at step 404 processor 246 determines whether a first set of sensors 227, those that are not in superimposition with electrical device 10, sense a greater amount of optical flux than a second set of optical sensors 10, those in superimposition with electrical device 10. If that is the case, then step 406 occurs during processor 246 activates emitters 225 associated with the second set. The result is that only emitters 225 in superimposition with electrical device 10 are activated. This reduces, if not prevents, optical energy diffusing away from charging station 212 and into the surrounding environment. Following activation of emitters at step 406, step 408 occurs during which processor 246 determines whether a desired charge in primary power storage system 30, shown in FIG. 3, had occurred.

Referring again to FIGS. 6-8, if it is determined at step 408 that a desired charge was present, the step 410 occurs. At step 410, emitters 225 are terminated and the process ends at step 412. Should it be determined at step 404 that charging station 212 be present in environment in which the level of ambient light was insufficient to create an optical flux differentiation between different sets of optical sensors 227, step 414 would occur. At step 414, processor 246 activates all emitters 225. The level of activation, however, may be any desired so long as a flux differential between two sets of sensors 227 may be detected in response to the activation of emitters, which would be identified at step 416. For example, assume that emitters are activated at full flux emission. Sensors 227 of the first set, those that are not in superimposition with electrical device 10, would sense a lower amount of optical flux than a second set of optical sensors 227, those in superimposition with electrical device 10. This results from the reflection of optical energy from electrical device 10. As a result, processor 246 deactivates emitters 225 associated with the first set of sensors at step 418. The result is that only emitters 225 in superimposition with electrical device 10 are active. This reduces, if not prevents, optical energy diffusing away from charging station 212 and into the surrounding environment. Following step 418, steps 408, 410 and 412 would occur, as discussed above.

Figure 9:
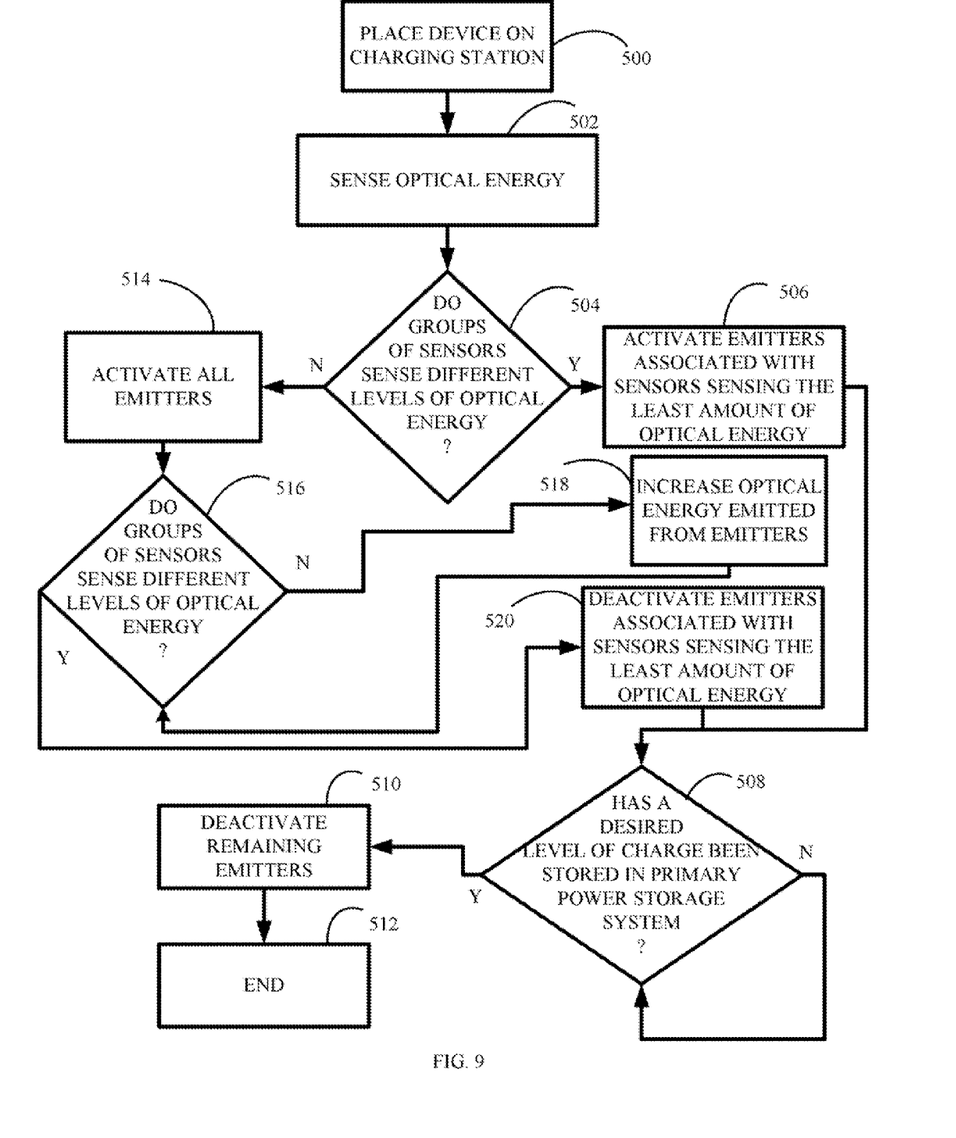
FIG. 9 is a flow diagram demonstrating the operation of the charging station shown in FIGS. 6 and 7 in accordance with an alternate embodiment.
Figure 10:
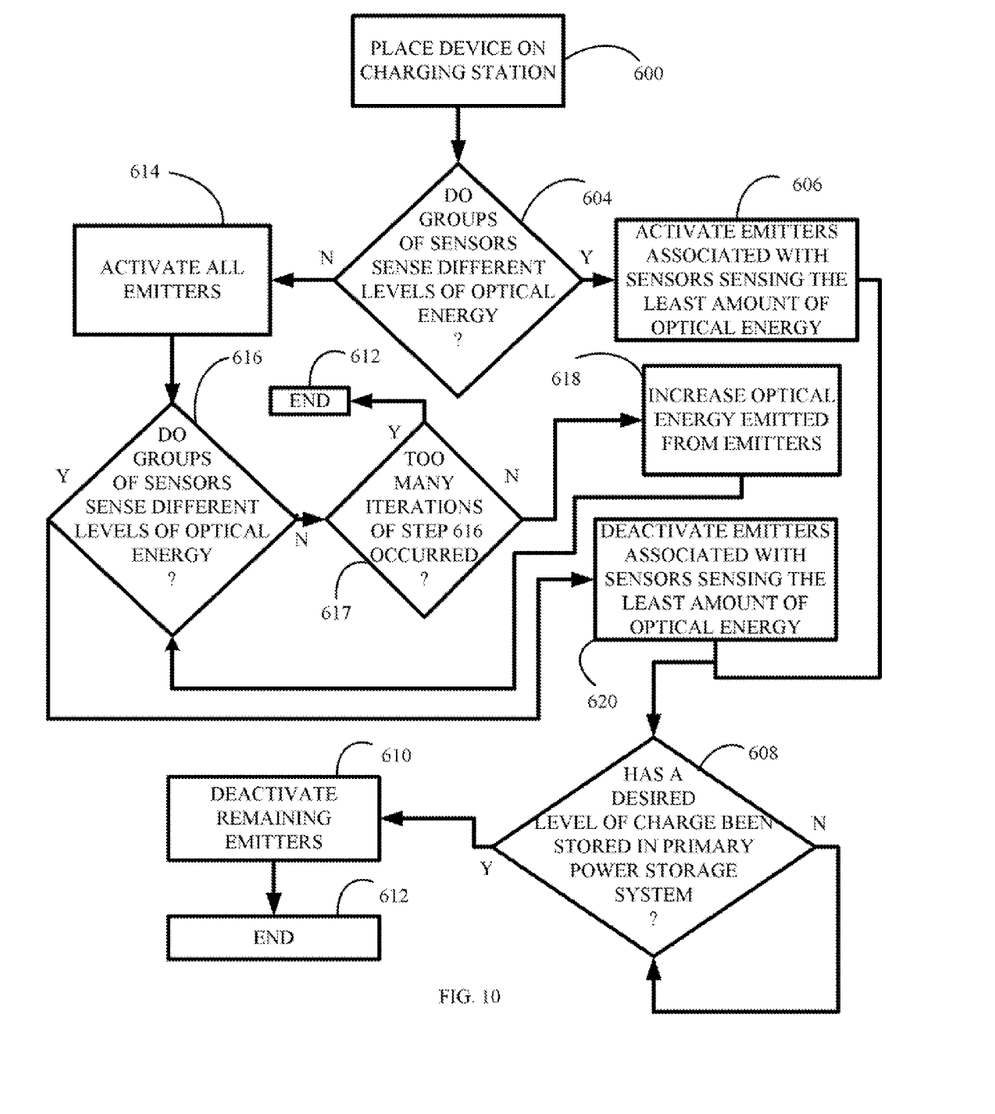
FIG. 10 is a flow diagram demonstrating the operation of the charging station shown in FIGS. 6 and 7 in accordance with a second alternate embodiment.

Referring to FIGS. 7-9, it should be understood, however, that the emitters 225 need not operate at full illumination. Rather, a lower level of illumination may be employed until the first set of emitters is deactivated. Following deactivation of emitters 225 of the first set by processor 246, processor 246 operates emitters 225 of the second set at the desired level, which in the case to minimize charge time could be a maximum level of optical energy emission. This is demonstrated by inclusion step 516 following step 514 with an understanding that steps 500, 502, 504, 506, 508, 510, 512 and 514 are that same as steps 400, 402, 404, 406, 408, 410, 412 and 414, respectively. Specifically, at step 516 processor 246 determines whether there is a differential in optical energy sensed between different groups of sensors 227. If not, step 518 occurs, during which processor 246 increases the optical energy produced by emitters 225. Following step 518, step 516 occurs again, with the understanding that this loop continues until differential is sensed. Once the differential in optical energy sensed between different groups of sensors 227 is sensed at step 516, step 520 occurs. At step 520 emitters 225 associated with sensors sensing the least amount of optical energy are deactivated. Thereafter, steps 508, 510 and 512 occur.

Referring to FIGS. 7-10 it may be desired to have the operation of charging system 212 be completely automated. As a result, emitters 225 may be configured to emit a low level of optical energy such that upon placement of electrical device 10 upon surface 229 step 604 occurs, which is identical to step 504. In fact, steps 606, 608, 610, 612, 614 and 616 are identical to steps 506, 508, 510, 512, 514 and 516, respectively. However, following step 616, step 617 occurs at which point processor 246 determines whether step 616 occurs a predetermined number of times. The number of times may be any established by the computer readable instructions in memory 248, e.g., 10, 20 and the like. Alternatively, the iterations may be measured in units of time during which step 616 occurs. Regardless, should the number of iterations exceed that established by the computer readable instructions, step 612 occurs at which point source 222 and oscillator 238 are deactivated. This avoids an endless loop situation in which charging station 212 will be fully activated and not charging electrical device 10.

Typically, surface 229 is positioned between the plurality of emitter-sensor pairs 223. It is desired that the material from which surface is fabricate to be substantially transparent to the optical energy produced by emitters 225. Moreover, it should be understood that emitters 225 and sensors, need not be concentrically disposed. Emitters 325 and sensors 327 of emitter-sensor pair 323 may be positioned side-by-side, as shown in FIG. 11.

Referring to both FIGS. 7 and 11, emitters 225 and 325 may be formed from light emitting diodes. Sensors 227 and 327 may be any one of variety of sensors available from companies such as Vishay Intertechnology, Inc. located at 63 Lancaster Avenue Malvern, Pa. 19355-2143; Intersil Corporation located at 1001 Murphy Ranch Road Milpitas, Calif. 95035; and Digi-Key Corporation located at 701 Brooks Avenue South, Thief River Falls, Minn. 56701.

It should be understood that the foregoing description is merely an example of the invention and that modifications may be made thereto without departing from the spirit and scope of the invention and should not be construed as limiting the scope of the invention. For example, the foregoing discussion is with respect to mobile electrical devices; however, the present invention may be employed with electrical devices that are not mobile, i.e., continuously and/or intermittently connected to an electrical grid. Furthermore, discussing the implementation of the present invention in a smartphone is not meant to limit the application of the current invention to smartphone mobile electrical devices. The present invention may be implemented in virtually any mobile electrical device, such as cameras, sensors, telephones, radios, tablet computers, wearable electronic devices, lighting systems, automobiles and drones just to name a few. The scope of the invention should be determined with respect to the appended claims, including the full scope of equivalents thereof.

The invention claimed is:

1. A charging system for charging an electrical device coupled to a photovoltaic electrical power generator and one or more of a microelectromechanical power generator and a thermoelectric power generator, said system comprising:
   a source; and
   a base portion having a surface, upon which said source is disposed to impinge optical energy toward said surface, said base portion including one or more of an oscillator connected to cause vibration of said base portion and a heat source in thermal communication with said base portion to increase thermal energy of said surface, whereby said electrical device is disposed upon said surface to sense said optical energy and one or more of said vibration and said thermal energy.

2. The charging system of claim 1 wherein said source is disposed opposite to said surface.

3. The charging system of claim 1 wherein said one or more of an oscillator and said heat source consists essentially of said oscillator.

4. The charging system of claim 1 wherein said one or more of an oscillator and said heat source consists essentially of said oscillator, with said source being positioned between said surface and said oscillator.

5. The charging system of claim 1 further including a jump case wherein said electrical device is a jump case includes said photovoltaic electrical power generator and one or more of a microelectromechanical power generator and a thermoelectric power generator and a coupler adapted to be placed in electrical communication with said electrical device.

6. The charging system of claim 1 further including a jump case wherein said electrical device is a jump case includes said photovoltaic electrical power generator and both of said microelectromechanical power generator and said thermoelectric power generator and a coupler adapted to be placed in electrical communication with said electrical device.

7. The charging system of claim 1 further including a jump case wherein said electrical device is a jump case includes said photovoltaic electrical power generator and one or more of a microelectromechanical power generator and a thermoelectric power generator and a coupler adapted to be placed in electrical communication with said electrical device and said source which is disposed opposite to said surface.

8. The charging system of claim 1 wherein said source includes a plurality of spaced-apart light emitters.

9. The charging system of claim 1 wherein said source includes a plurality of spaced-apart light emitter-sensor units.

10. A charging system for charging an electrical device coupled to a photovoltaic electrical power generator and one or more of a microelectromechanical power generator and a thermoelectric power generator, said system comprising:
    a source; and
    a base portion having a surface, upon which said source is disposed to impinge optical energy toward said surface and produce an illuminated region having an area associated therewith with said area being co-extensive with an area of a photosensor of said photovoltaic electrical power generator, said base portion including one or more of an oscillator connected to cause vibration of said base portion and a heat source in thermal communication with said base portion to increase thermal energy of said surface, whereby said electrical device is disposed upon said surface to sense said optical energy and one or more of said vibration and said thermal energy.

11. The charging system of claim 10 wherein said source is disposed opposite to said surface.

12. The charging system of claim 10 wherein said one or more of an oscillator and said heat source consists essentially of said oscillator, with said source being positioned between said surface and said oscillator.

13. The charging system of claim 10 further including a jump case wherein said electrical device is a jump case includes said photovoltaic electrical power generator and one or more of a microelectromechanical power generator and a thermoelectric power generator and a coupler adapted to be placed in electrical communication with said electrical device.

14. The charging system of claim 10 wherein said source includes a plurality of spaced-apart light emitters and said surface includes a plurality of spaced apart apertures, with each aperture of a first set being associated with one of said spaced-apart light emitters so that optical energy produced by an associated light emitter can propagate therethrough, and each aperture of a second set being associated with a light sensor.

15. The charging system of claim 10 wherein said source includes a plurality of light spaced-apart light emitter-sensor units and said surface includes a plurality of spaced-apart apertures, with each apertures of a subset of said plurality of spaced-apart apertures being associated with one of said spaced-apart light emitter-sensor units so that optical energy produced by an associated light emitter can propagate therethrough.

16. A charging system for charging an electrical device coupled to a photovoltaic electrical power generator and one or more of a microelectromechanical power generator and a thermoelectric power generator, said system comprising:

a source; and a base portion having a surface, with said source being disposed to impinge optical energy toward said surface and produce an illuminated region having an area associated therewith with said area being co-extensive with an area of a photosensor of said photovoltaic electrical power generator, said base portion including one or more of an oscillator connected to cause vibration of said base portion and a heat source in thermal communication with said base portion to increase thermal energy of said surface, whereby said electrical device is disposed upon said surface to sense said optical energy and one or more of said vibration and said thermal energy.

17. The charging system of claim 16 wherein said one or more of an oscillator and said heat source consists essentially of said oscillator, with said source being positioned between said surface and said oscillator.

18. The charging system of claim 17 further including a jump case wherein said electrical device is a jump case includes said photovoltaic electrical power generator and one or more of a microelectromechanical power generator and a thermoelectric power generator and a coupler adapted to be placed in electrical communication with said electrical device.

19. The charging system of claim 18 wherein said source includes a plurality of spaced-apart light emitters.

20. The charging system of claim 18 wherein said source includes a plurality of spaced-apart light emitter-sensor units.

* * * * *